(12) United States Patent
Palamadai et al.

(10) Patent No.: US 12,462,918 B2
(45) Date of Patent: Nov. 4, 2025

(54) MENTAL HEALTH ANOMALY DETECTION AND GUIDANCE

(71) Applicant: AT&T Intellectual Property I, L.P., Atlanta, GA (US)

(72) Inventors: Rashmi Palamadai, Naperville, IL (US); Brian Novack, St. Louis, MO (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 69 days.

(21) Appl. No.: 18/089,863

(22) Filed: Dec. 28, 2022

(65) Prior Publication Data

US 2024/0221909 A1    Jul. 4, 2024

(51) Int. Cl.
*G16H 20/70*    (2018.01)
*G16H 40/67*    (2018.01)
*G16H 50/30*    (2018.01)

(52) U.S. Cl.
CPC ............ *G16H 20/70* (2018.01); *G16H 40/67* (2018.01); *G16H 50/30* (2018.01)

(58) Field of Classification Search
CPC ......... G16H 20/70; G16H 40/67; G16H 50/30
See application file for complete search history.

(56) References Cited

U.S. PATENT DOCUMENTS

| | | | | |
|---|---|---|---|---|
| 10,388,410 | B1* | 8/2019 | LaBorde | G16H 50/70 |
| 10,755,187 | B2* | 8/2020 | Egi | G06Q 10/105 |
| 11,195,618 | B2* | 12/2021 | Generoso | G06Q 50/01 |
| 11,804,039 | B2* | 10/2023 | Jorasch | G06V 40/19 |
| 2020/0020447 | A1* | 1/2020 | Generoso | G16H 50/70 |
| 2023/0101506 | A1* | 3/2023 | Rowland | G16H 10/60 |
| | | | | 705/3 |

OTHER PUBLICATIONS

Applications of Artificial Intelligence and Machine Learning, Elsevier, Soumya, 2021, pp. 3-12.*

* cited by examiner

*Primary Examiner* — Michael I Ezewoko
(74) *Attorney, Agent, or Firm* — Hartman & Citrin LLC

(57) ABSTRACT

Concepts and technologies disclosed herein are directed to mental health anomaly detection and guidance. According to one aspect of the concepts and technologies disclosed herein, a mental health user system can create a baseline user behavior profile for a user. The mental health user system can monitor a behavior of the user. The mental health user system can determine whether the behavior of the user is anomalous in comparison to the baseline user behavior profile. The mental health user system can, in response to determining that the behavior of the user is anomalous, provide a treatment to the user to return the behavior to be consistent with the baseline user behavior profile.

17 Claims, 8 Drawing Sheets

MENTAL HEALTH ANOMALY DETECTION AND GUIDANCE

BACKGROUND

Today, if a person is dealing with a mental health issue, regardless of whether or not it has been formally diagnosed, it is often necessary for that person or their family/support to engage a mental health professional directly. This can be challenging if the person does not want to meet with the mental health professional, does not want to or cannot travel to the mental health professional, and/or if the sessions become cost prohibitive. Additionally, the follow-through on a treatment plan can be a challenge for these and/or other reasons. As a result, the person often resorts to self-treatment or no treatment, leaving the mental health issue to negatively impact the quality of life for both the person and those around them.

SUMMARY

Concepts and technologies disclosed herein are directed to mental health anomaly detection and guidance. According to one aspect of the concepts and technologies disclosed herein, a mental health user system can create a baseline user behavior profile for a user. The mental health user system can monitor a behavior of the user. The mental health user system can determine whether the behavior of the user is anomalous in comparison to the baseline user behavior profile. The mental health user system can, in response to determining that the behavior of the user is anomalous, provide a treatment to the user to return the behavior to be consistent with the baseline user behavior profile.

In some embodiments, the mental health user system can utilize a machine learning system to record a baseline user behavior of the user within a user environment to create the baseline user behavior profile. The machine learning system can be part of the mental health user system or external to the mental health user system. The mental health user system can receive data from one or more devices operating within the user environment.

In some embodiments, the mental health user system can monitor the behavior of the user based upon output of data received from an external device. The external device can be a user sensor device, a smart home device, a connected car device, or a user environment device.

In some embodiments, the mental health user system can provide the treatment to the user to return the behavior to be consistent with the baseline user behavior profile by providing active encouragement to the user. In some embodiments, the mental health user system can provide the treatment to the user to return the behavior to be consistent with the baseline user behavior profile by providing passive encouragement to the user. In some embodiments, the mental health user system can provide the treatment to the user to return the behavior to be consistent with the baseline user behavior profile by escalating to an emergency service. In some embodiments, the mental health user system can provide the treatment to the user to return the behavior to be consistent with the baseline user behavior profile by escalating to a healthcare professional. In some embodiments, the mental health user system can provide the treatment to the user to return the behavior to be consistent with the baseline user behavior profile by escalating to a friend or family member of the user.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
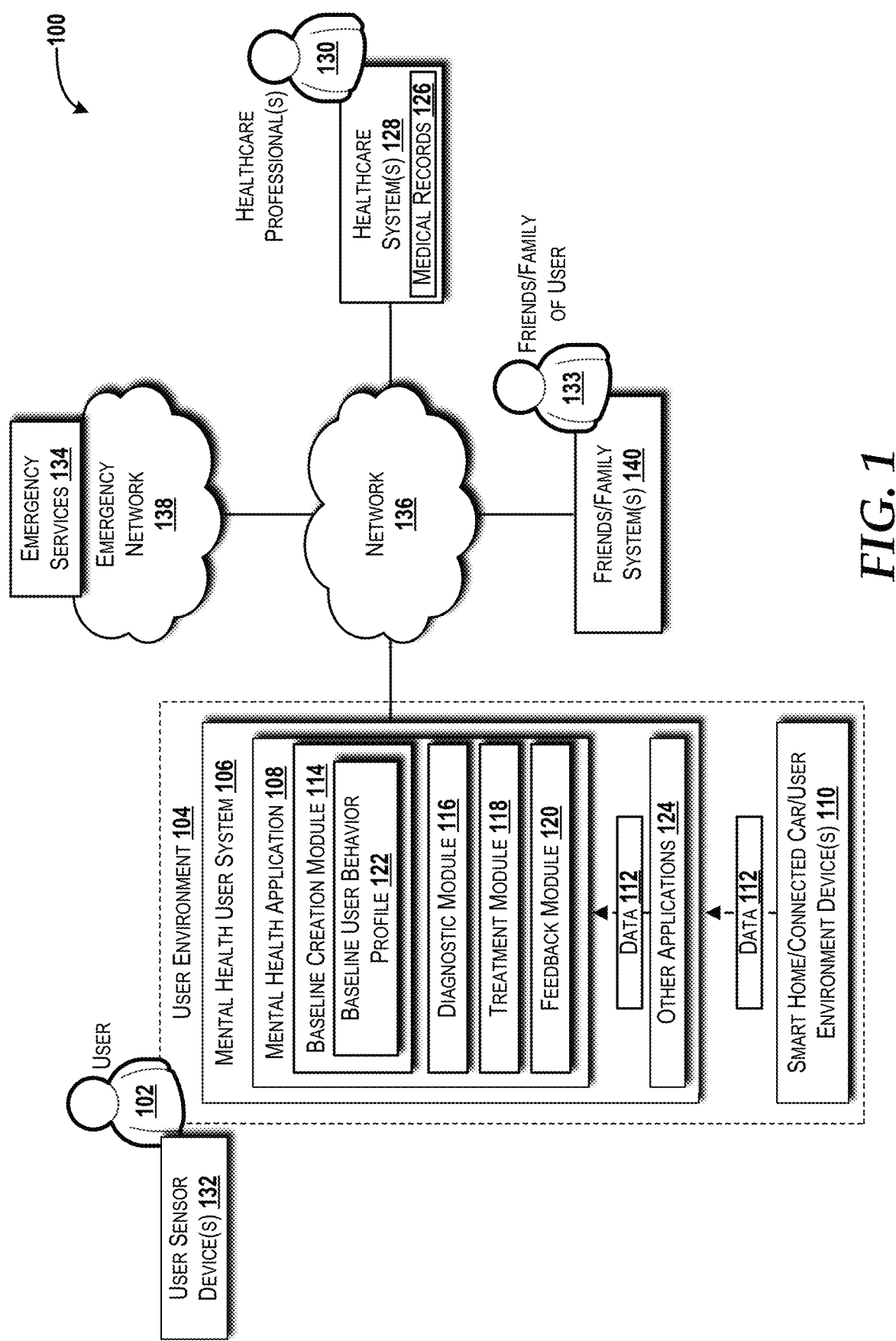
FIG. 1 is a block diagram illustrating an operating environment in which aspects of the concepts and technologies disclosed herein can be implemented.

Referring now FIG. 1, a block diagram illustrating an operating environment 100 in which aspects of the concepts and technologies disclosed herein can be implemented will be described. The illustrated operating environment 100 includes a user 102 associated with a user environment 104, such as their home, business, vehicle, or any other environment in which the user 102 finds themselves. The user environment 104 can include a mental health user system 106. The mental health user system 106 can execute a mental health application 108 to perform various operations described herein below.

Figure 4:
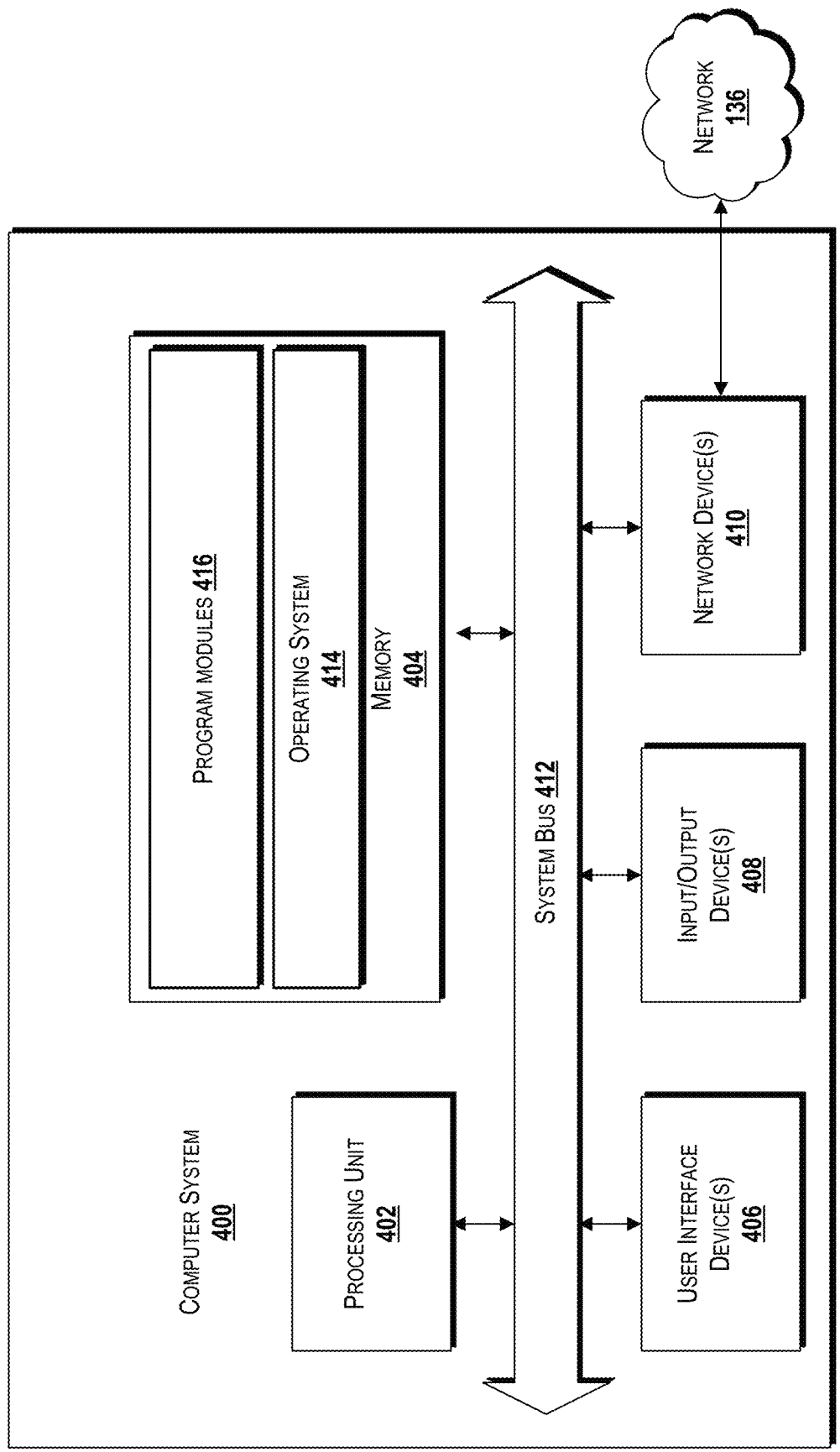
FIG. 4 is a block diagram illustrating an example computer system capable of implementing aspects of the embodiments presented herein.
Figure 5:
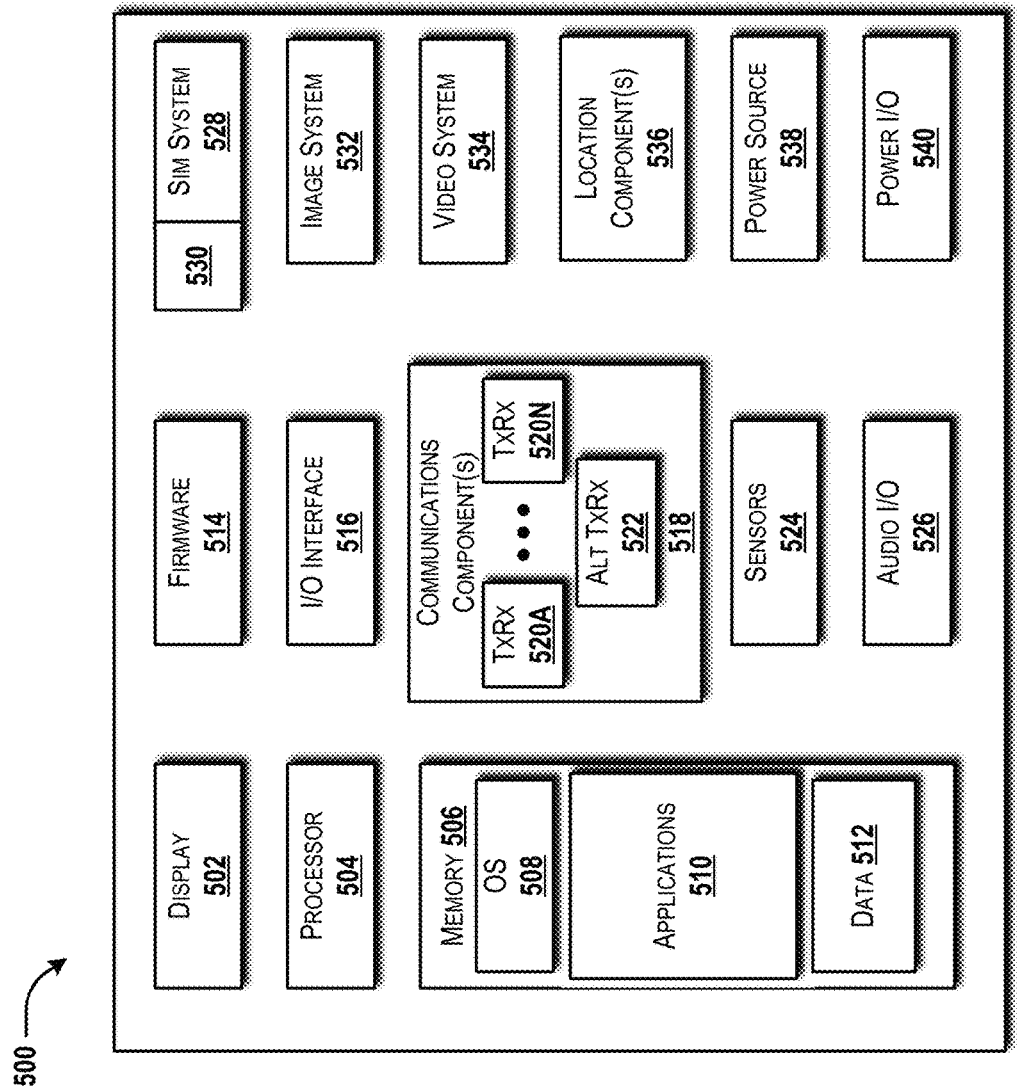
FIG. 5 is a block diagram illustrating an example mobile device capable of implementing aspects of the embodiments disclosed herein.

The mental health user system 106 can be implemented as a traditional desktop or laptop, a tablet, a smartphone, a virtual assistant device (e.g., an ALEXA compatible device available from AMAZON.COM INC., a GOOGLE ASSISTANT compatible device available from GOOGLE LLC, an APPLE SIRI compatible device available from APPLE INC., or the like), a smart home device, an Internet of Things ("IoT") device, a connected car device, combinations thereof, and/or the like (examples shown in FIGS. 4 and 5). In some embodiments, the mental health user system 106 can include a combination of these devices, which may, for example, execute the same or a similar application, such as the mental health application 108 shown in the illustrated example. In some other embodiments, the mental health user system 106 can operate in communication with one or more external devices, such as smart home devices, connected car devices, other user environment devices, combinations thereof, and/or the like (generally shown as 110), which can provide data 112 collected from the user environment 104 to the mental health application 108. The following are illustrative examples centered on the use of external device or service interactions, where the speed or frequency of a user interacting with connected devices may create a baseline: (1) in the morning, how fast does the user turn on a light in her or his room, then the bathroom, then the stairwell, and then the kitchen; (2) in connected cars, the speed of driving, lane changes, near-accident warnings (e.g. blind spot detection, in-lane violations, following distance, and/or the like), and performative observations (e.g., speed relative to posted speed limit, acceleration and/or deceleration rate, etc.); (3) for connected car and internal home devices, does the user increase the volume amplitude, the brightness, and/or contrast of a display, or the equivalent of certain types of content (e.g., speech, music, signs, computer graphics, etc.) when in different contexts; (4) the user asks for repeated prompts or slows her or his response time to virtual assistant-based prompts (e.g. timers, weather notifications, and questions for functionality); (5) for the consumption of website or entertainment content, has the user's rate of consumption (e.g., the raw count and frequency of episodes of a series) or the interaction between consumption (e.g., pauses, continue next episode, etc.) changed; and (6) change in the text, tone, or sentiment in personal or public correspondence from the user (e.g. text is more confused, radical, or despondent from others).

The illustrated mental health application 108 includes a plurality of application modules, including a baseline creation module 114, a diagnostic module 116, a treatment module 118, and a feedback module 120 that each can include instructions executed by one or more processors (best shown in FIGS. 4 and 5). Although certain application modules are described herein, the mental health application 108 may provide additional functionality via other application modules not shown.

The baseline creation module 114 can utilize machine learning/deep learning (example machine learning system shown in FIG. 7) to record baseline user behavior of the user 102 within the user environment 104 to create a baseline user behavior profile 122. The baseline user behavior profile 122 combines eating habits, exercise habits, social interactions, other behaviors, and/or the like. The baseline creation module 114 can create the baseline user behavior profile 122 to establish what is normal behavior for the user 102. The baseline creation module 114 can create the baseline user behavior profile 122 over time. In some embodiments, the baseline creation module 114 can prompt the user 102 to provide basic information about the user's 102 eating habits, exercise habits, social interactions, other behaviors, and/or the like. For example, the baseline creation module 114 may provide a questionnaire to the user 102. In some embodiments the mental health application 108 can be connected to other applications 124, such as diet applications, exercise applications, social applications, combinations thereof, and/or the like, that can track aspects of the user's 102 behavior and can provide associated data 112 to the mental health application 108. Similar applications additionally or alternatively can be executed by the device(s) 110.

The baseline creation module 114 also can access medical records 126 from one or more healthcare systems 128. The healthcare systems 128 can include private practice systems, health insurance systems, hospital network systems, and/or the like associated with one or more healthcare professionals 130 (e.g., psychiatrists, psychologists, general physicians, specialty physicians, and/or the like).

The baseline creation module 114 also can obtain sensor data, such as the data 112, from one or more sensor devices, such as one or more of the devices 110 (e.g., the user environment devices) and/or one or more user sensor devices 132 (e.g., a fitness tracker, smart watch, smart ring, or other device that includes one or more physiological/biometric sensors). As such, the data 112 also can include the user's 102 physiological/biometrics (e.g., EEG, heart rate, perspiration rate, pulse ox, blood sugar level, body temperature, hormone levels, combinations thereof, and/or the like) that, in turn, can provide indications of the user's 102 mental state (e.g., calm, anxious, stressed, etc.). Direct feedback from the user 102 is also contemplated After the baseline user behavior profile 122 has been created, the diagnostic module 116 can be executed to monitor the user's 102 behavior. The diagnostic module 116 can determine if the user 102 is behaving in accordance with the baseline user behavior profile 122 or outside of what is considered normal for the user 102 based upon the baseline user behavior profile 122. If the user 102 is behaving outside of what is considered normal for the user 102, the mental health user system 106 can engage the user 102 via the treatment module 118. The ability of the diagnostic module 116 to accurately diagnose the user 102 can be improved over time as more interactions occur and as the user 102 interacts with the healthcare professional(s) 130 and the medical records 126 are updated.

The treatment module 118 can provide verbal coaching/ encouragement and can perform increasing levels of action based on the output from the diagnostic module 116. For example, the treatment module 118 can provide passive encouragement such as providing a positive/uplifting user environment 104 through music, stories, pictures, videos, and/or other tools in an effort to change the user's 102 mood. The treatment module 118 can provide active encouragement by asking the user 102 how he/she is feeling. For example, the treatment module 118 can state the behavior that was considered outside of the baseline user behavior profile 122. In some embodiments, the treatment module 118 may encourage the user 102 to respond, may attempt to coach the user 102 through the situation, and may attempt to explain what is going on, perhaps in an effort to provide some perspective on the situation. Other instances of the treatment module 118 may execute to increase social connectivity on behalf of the user 102. In one example, encouraging casual social connections (e.g., "Would you like to call your friend Aria? It's been a couple of months since you last caught up!"), the solicitation of other social communities (e.g., "I found a new interesting posts in a group Texas Gardeners by your friend Paula that may get you back in the spring gardener spirit!"), or subtle accomplishments on behalf of the user 102 through social communications (e.g., "Nice job in completing your crossword puzzle objectives yesterday! Want to share this update with your competitive friends Mary, Riley, Zoë, and Amy?"). Other social connectivity for common activities regarding electronic content (e.g., reading headlines, newsletters, and/or listening to audio podcasts) may be added contextually as the user's 102 baseline application and content footprints change.

The feedback module 120 can utilize machine learning/deep learning (machine learning system best shown in FIG. 7) to analyze output from the diagnostic module 116 and the treatment module 118, in consideration of the baseline user behavior profile 122, to learn behavior patterns of the user 102 and what worked/did not work to help the user 102 through a situation. The feedback module 120 can also determine when to reach out to the healthcare professional (s) 130, friends/family of the user 133, and/or emergency services 134. The feedback module 120 can communicate with the other modules 114, 116, 118 to update the baseline user behavior profile 122, to inform the diagnostic module 116 of how correct (or not) a diagnosis was, and to inform the treatment module 118 of what treatment(s) were effective (or not).

Although these specific application modules are illustrated and described herein, the mental health application 108 can include additional application modules. As such, the mental health application 108 can provide specific functionality described herein via the modules 114, 116, 118, 120 and additional functionality not described with respect to the modules 114, 116, 118, 120. Moreover, the modules 114, 116, 118, 120 are described separately as part of the mental health application 108 for ease of explanation and not limitation. Those skilled in the art will appreciate that the mental health application 108 can include the functionality described herein with respect to the modules 114, 116, 118, 120 separately from the execution, by the mental health user system 106, of any specific module.

Figure 8:
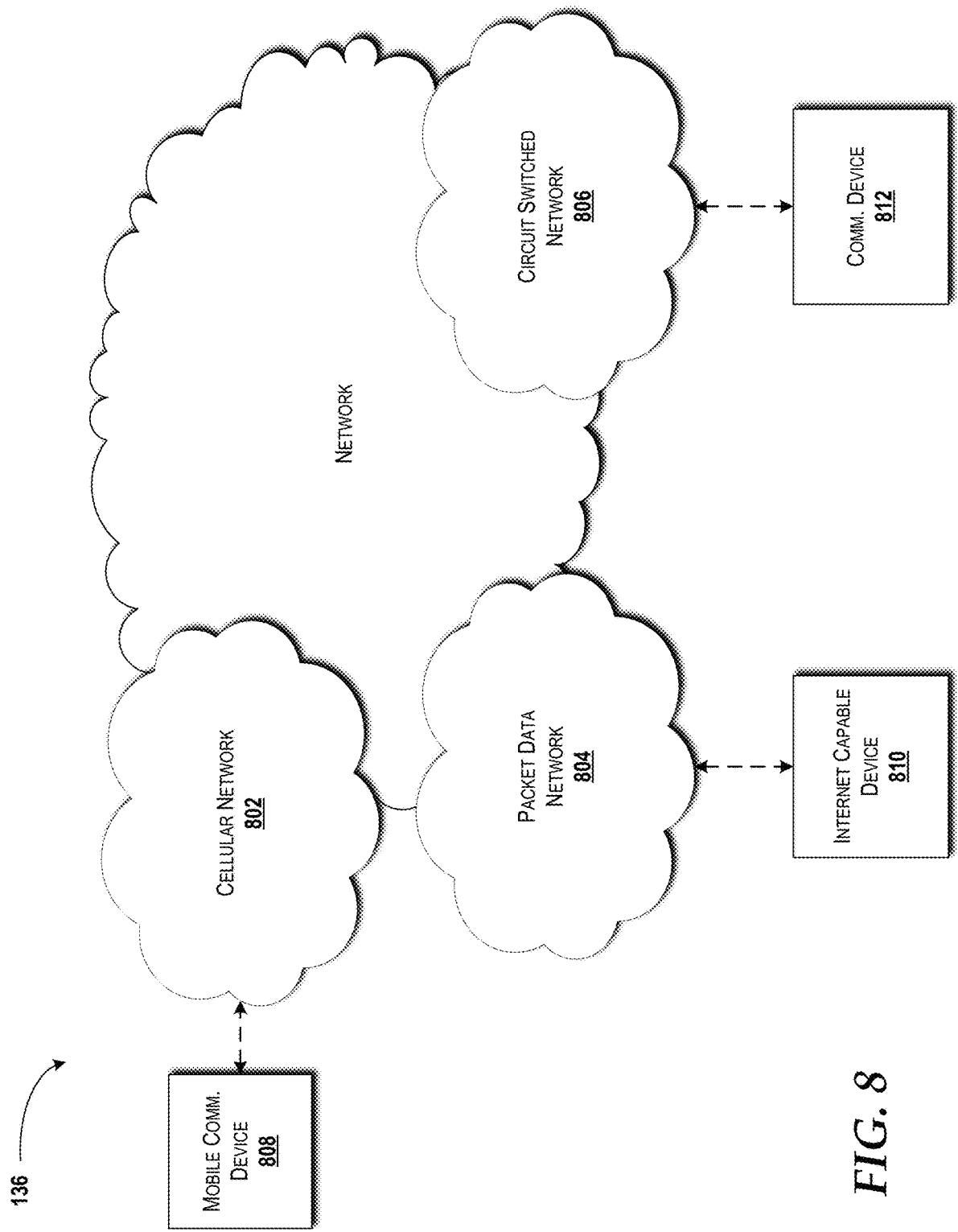
FIG. 8 is a diagram illustrating a network, according to an illustrative embodiment.

The mental health user system 106 is shown operating in communication with a network 136 (shown in detail in FIG. 8). The network 136 can facilitate communications among the mental health user system 106, the healthcare system(s) 128, the emergency services 134 (e.g., police, fire, ambulance, and/or other emergency services) via an emergency network 138 (e.g., 9-1-1 network), and one or more friends/family systems 140 (e.g., computers, mobile devices, and the like associated with the friends/family of the user 133).

Some example use cases of how the mental health user system 106 can be utilized to detect mental health anomalies and to provide guidance to the user 102 will now be described. The mental health user system 106 can detect that the user 102 is experiencing increased anxiety (e.g., anxiety attack) during an activity that typically does not increase the user's 102 anxiety. For example, the user 102 typically may have no problem picking up his/her children from school, but in the pickup line the data 112 may indicate otherwise (e.g., increased heart rate, increased respirations per minute, increased perspiration, and/or the like). The mental health user system 106 can detect that the user 102 is experiencing an unusual fear or concern with common events (e.g., a symptom of agoraphobia) when the user 102 has to meet people in a work or casual setting that typically does not affect the user 102, but now causes the user 102 to hesitate or make excuses not to attend. In some embodiments, interactions with the other applications (e.g., calendar applications, email applications, text message applications, social media applications, a combination thereof, and/or the like) may provide a clue to the mental health user system 106 that the user 102 is experiencing such hesitation. The mental health user system 106 can detect trends, such as lethargy or apathy within existing events.

Figure 2:
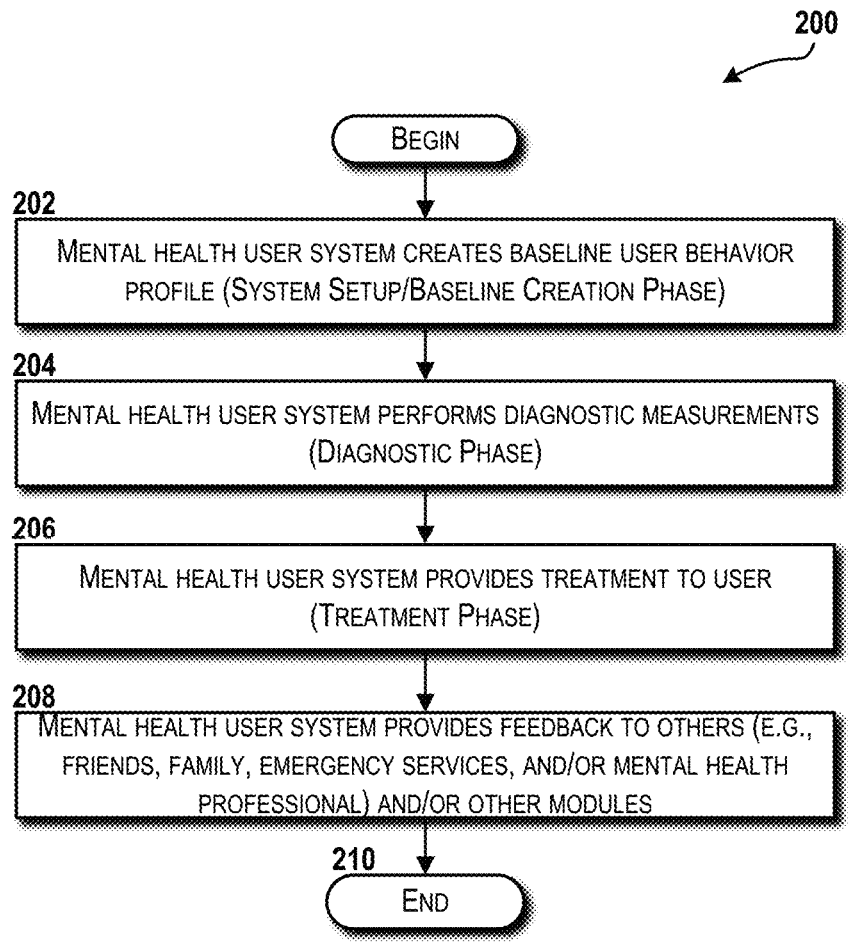
FIG. 2 is a flow diagram illustrating aspects of a method for mental health tracking, according to an illustrative embodiment.

Turning now to FIG. 2, a method 200 for mental health anomaly detection and guidance will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or multiple processors of one or more systems and/or one or more devices disclosed herein to perform one or more operations and/or causing the processor to direct other components of the computing system or device to perform one or more of the operations.

The method 200 begins and proceeds to operation 202. At operation 202, the mental health user system 106, via execution of the baseline creation module 114, creates the baseline user behavior profile 122 as part of a system setup/baseline creation phase. The baseline creation module 114 can utilize machine learning/deep learning (example machine learning system shown in FIG. 7) to record baseline user behavior of the user 102 within the user environment 104 to create a baseline user behavior profile 122. The baseline user behavior profile 122 combines eating habits, exercise habits, social interactions, other behaviors, and/or the like. The baseline creation module 114 can create the baseline user behavior profile 122 to establish what is normal behavior for the user 102. The baseline creation module 114 can create the baseline user behavior profile 122 over time. In some embodiments, the baseline creation module 114 can prompt the user 102 to provide basic information about the user's 102 eating habits, exercise habits, social interactions, other behaviors, and/or the like. For example, the baseline creation module 114 may provide a questionnaire to the user 102. In some embodiments the mental health application 108 can be connected to the other applications 124 that can track aspects of the user's 102 behavior and can provide associated data 112 to the mental health application 108. The baseline creation module 114 also can access medical records 126 from the healthcare system(s) 128. The baseline creation module 114 also can obtain sensor data, such as the data 112, from the devices 110 and/or the user sensor device(s) 132.

From operation 202, the method 200 proceeds to operation 204. At operation 204, the mental health user system 106, via execution of the diagnostic module 116, performs diagnostic measurements during a diagnostic phase. The diagnostic module 116 can be executed to monitor the user's 102 behavior. The diagnostic module 116 can determine if the user 102 is behaving in accordance with the baseline user behavior profile 122 or outside of what is considered normal for the user 102 based upon the baseline user behavior profile 122. If the user 102 is behaving outside of what is considered normal for the user 102, the mental health user system 106 can engage the user 102 via the treatment module 118. The ability of the diagnostic module 116 to accurately diagnose the user 102 can be improved over time as more interactions occur and as the user 102 interacts with the healthcare professional(s) 130 and the medical records 126 are updated.

From operation 204, the method 200 proceeds to operation 206. At operation 206, the mental health user system 106, via execution of the treatment module 118, provides treatment to the user 102 during a treatment phase. The treatment module 118 can provide verbal coaching/encouragement (e.g., as part of virtual assistant/smart speaker functionality) and can perform increasing levels of action based on the output from the diagnostic module 116. For example, the treatment module 118 can provide passive encouragement such as providing a positive/uplifting user environment 104 through music, stories, pictures, videos, and/or other tools in an effort to change the user's 102 mood. The treatment module 118 can provide active encouragement by asking the user 102 how he/she is feeling. For example, the treatment module 118 can state the behavior that was considered outside of the baseline user behavior profile 122. In some embodiments, the treatment module 118 may encourage the user 102 to respond, may attempt to coach the user 102 through the situation, and may attempt to explain what is going on, perhaps in an effort to provide some perspective on the situation. The treatment module 118 may escalate to reach out to the emergency services 134, the healthcare professional(s) 130, the friends/family 133, or any combination thereof on behalf of the user 102.

From operation 206, the method 200 proceeds to operation 208. At operation 208, the mental health user system 106, via execution of the feedback module 120, provides feedback to others (e.g., friends, family, emergency services, and/or mental health professionals) and/or the modules 114, 116, 118. The feedback module 120 can utilize machine learning/deep learning (machine learning system best shown in FIG. 7) to analyze output received from the diagnostic module 116 and the treatment module 118, in consideration of the baseline user behavior profile 122, to learn behavior patterns of the user 102 and what worked/did not work to help the user 102 through a situation. The feedback module 120 can also determine when to reach out to the healthcare professional(s) 130, the friends/family of the user 133, and/or emergency services 134. The feedback module 120 can communicate with the other modules 114, 116, 118 to update the baseline user behavior profile 122, to inform the diagnostic module 116 of how correct (or not) a specific diagnosis/was, and to inform the treatment module 118 of what treatment(s) were effective (or not).

From operation 208, the method 200 proceeds to operation 210. The method 200 can end at operation 210.

Figure 3:
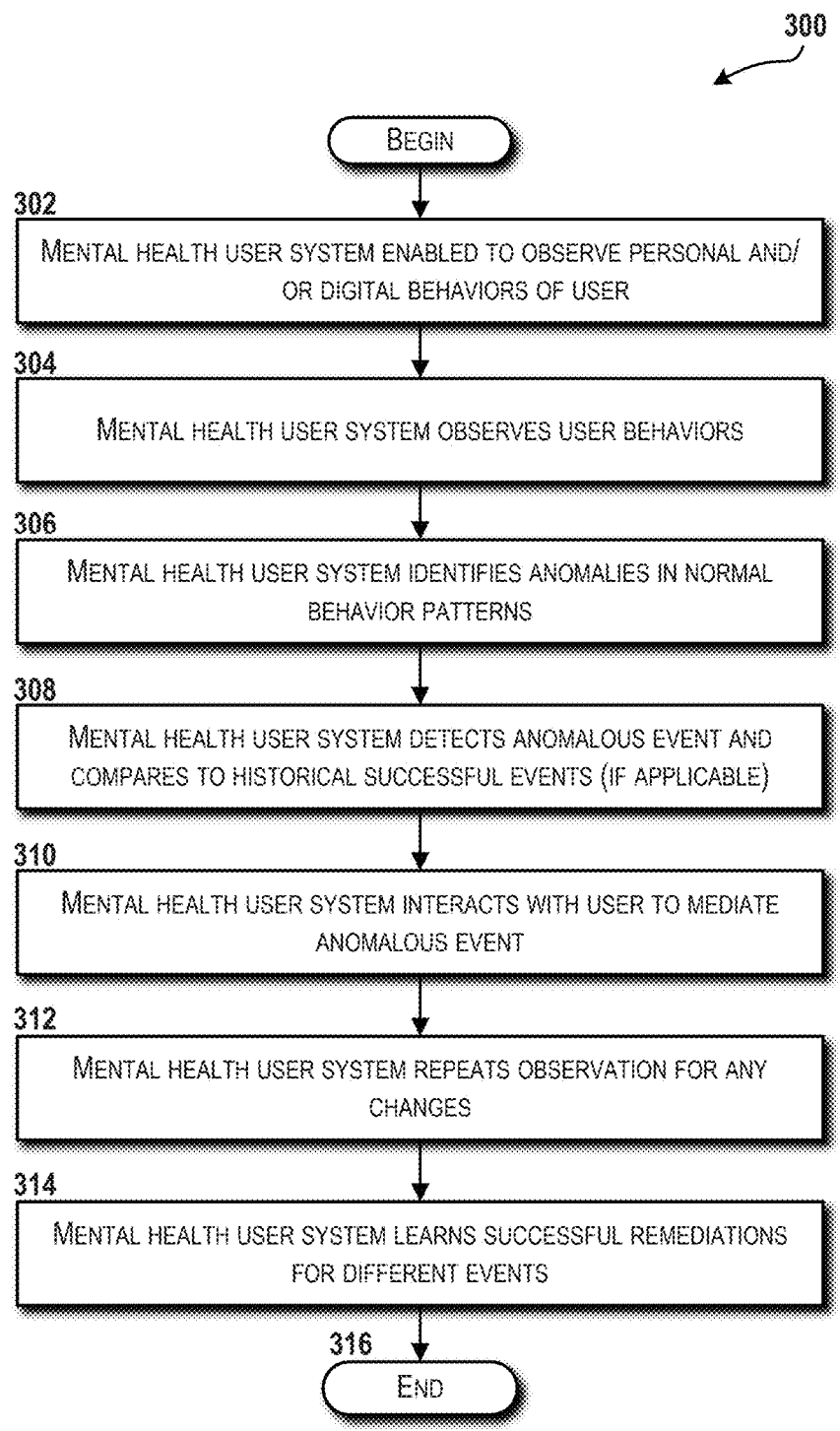
FIG. 3 is a flow diagram illustrating aspects of another method for mental health tracking, according to an illustrative embodiment.

Turning now to FIG. 3, a more detailed method 300 for mental health anomaly detection and guidance will be described, according to an illustrative embodiment. The method 300 begins and proceeds to operation 302. At operation 302, the mental health user system 106 is enabled to observe personal and/or digital behaviors of the user 102. The mental health user system 106 can observe Internet browser history, search history, phone call history, output from the devices 110 and/or the user sensor device(s) 132, facial expressions, and/or other aspects of personal and/or digital behaviors of the user 102. From operation 302, the method 300 proceeds to operation 304.

At operation 304, the mental health user system 106 observes the user's 102 behaviors (e.g., as distinct behavior events). The mental health user system 106 can obtain calendar events from the user's 102 calendar(s). The mental health user system 106 can auto-partition user actions by change of event type (e.g., watching television, then web browsing, then driving somewhere, etc.). The mental health user system 106 can segment user activity into event types. The mental health user system 106 can observe general dwell time, completion time, and other tasks completed in a given time period. From operation 304, the method 300 proceeds to operation 306.

At operation 306, the mental health user system 106 identifies anomalies in normal behavior patterns of the user 102 based upon the baseline user behavior profile 122. For example, the mental health user system 106 can determine that the user 102 is taking too long during a specific behavior event or missing part of an event, exhibiting underflow (e.g., disinterest), exhibiting overflow (e.g., obsessive consumption/binging) of digital content during the event, exhibiting unusual physical manifestations during the event (e.g., heart rate elevated, specific facial expressions, crying, hysterical laughing, etc.). From operation 306, the method 300 proceeds to operation 308.

At operation 308, the mental health user system 106 detects an anomalous event and compares the anomalous event to historical successful events (if applicable). The mental health user system 106 can determine what task the user 102 was doing before/after in historical successful events. The mental health user system 106 also can determine one or more actions to best get the user 102 back into the historical task and state of mind. For example, the user 102 may be socializing and may need additional motivation to start driving to a destination (e.g., at which a time-sensitive event will take place). From operation 308, the method 300 proceeds to operation 310.

At operation 310, the mental health user system 106 interacts with the user 102 to mediate the anomalous event. For example, the mental health user system 106 can propose an action to the user 102 through dialog, coaxing, digital "diet," and/or may attempt automation to disable/enable the next task in the event. The mental health user system 106 can reach out to other systems, such as the device(s) 110, to change the user environment 104 in some way. For example, the device(s) 110 can change a temperature in the user environment 104, play music in the user environment 104, remotely start the user's 102 vehicle, or request a transportation service on the user's behalf. The mental health user system 106 can reach out to the friends/family 133 for interaction (e.g., call a child or parent to help with the situation). The mental health user system 106 can escalate to the emergency services 134 and/or the healthcare professional(s) 130 for additional assistance. From operation 310, the method 300 proceeds to operation 312.

At operation 312, the mental health user system 106 repeats its observation for any changes in the user's 102 behavior. From operation 312, the method 300 proceeds to operation 314.

At operation 314, the mental health user system 106 learns successful remediations for different events. The mental health user system 106 can generate a report for the user 102 to self-heal/observe. The mental health user system 106 can provide the report to the healthcare professional(s) 130 and/or the friends/family 133. The mental health user system 106 can trigger a certain cadence of enhanced care/action. The mental health user system 106 can reduce time/threshold for anomalous event detection in the future (e.g., dissuade the user 102 from binge eating before attempting to solve anxiety). The mental health user system 106 can share any of this information with the user sensor device(s) 132 and/or the device(s) 110, which can add the user 102 in remediation efforts.

From operation 314, the method 300 proceeds to operation 316. The method 300 can end at operation 316.

Turning now to FIG. 4, a block diagram illustrating a computer system 400 configured to provide the functionality described herein in accordance with various embodiments of the concepts and technologies disclosed herein. In some embodiments, the mental health user system 106, the device(s) 110, the healthcare system(s) 128, the friends/family system(s) 140, and/or other systems not specifically described herein can be configured the same as or similar to the computer system 400.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 402 can be a single processing unit or a multiple processing unit that includes more than one processing component. Processing units are generally known, and therefore are not described in further detail herein.

The memory 404 communicates with the processing unit 402 via the system bus 412. The memory 404 can include a single memory component or multiple memory components. In some embodiments, the memory 404 is operatively connected to a memory controller (not shown) that enables communication with the processing unit 402 via the system bus 412. The memory 404 includes an operating system 414 and one or more program modules 416. The operating system 414 can include, but is not limited to, members of the WINDOWS family of operating systems from MICROSOFT CORPORATION, the LINUX family of operating systems, the MAC OSX and iOS, families of operating systems from APPLE INC., other operating systems, and the like.

The program modules 416 may include various software and/or program modules described herein. In some embodiments, the program modules 416 in the mental health user system 106 configured like the computer system 400 can include, for example, the mental health application 108 (and associated modules 114, 116, 118, 120) and/or the other application(s) 124. In some embodiments, multiple implementations of the computer system 400 can be used, wherein each implementation is configured to execute one or more of the program modules 416. The program modules 416 and/or other programs can be embodied in computer-readable media containing instructions that, when executed by the processing unit 402, perform the methods described herein. According to embodiments, the program modules 416 may be embodied in hardware, software, firmware, or any combination thereof. Although not shown in FIG. 4, it should be understood that the memory 404 also can be configured to store the data 112, the medical records 126, and/or other data disclosed herein.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium," "computer-readable storage medium," and variations thereof does not include waves or signals per se and/or communication media, and therefore should be construed as being directed to "non-transitory" media only.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via the network 136. Examples of the network devices 410 include, but are not limited to, a modem, a radio frequency ("RF") or infrared ("IR") transceiver, a telephonic interface, a bridge, a router, or a network card. The network 136 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 136 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Turning now to FIG. 5, an illustrative mobile device 500 and components thereof will be described. In some embodiments, the mental health user system 106 described herein can be configured similar to or the same as the mobile device 500. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data, such as the data 112 and/or the medical records 126. According to various embodiments, the display 502 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510 (e.g., the mental health application 108 and/or the other applications 124), other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The applications 510 can include the mental health application 108, the other application(s) 124, or some combination thereof.

The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks, such as the network 136, the Internet, or some combination thereof. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 518 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 536 can be configured to capture, process, record, modify, and/or store video content. Photos and videos obtained using the image system 532 and the video system 534, respectively, may be added as message content to an MMS message, email message, and sent to another device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
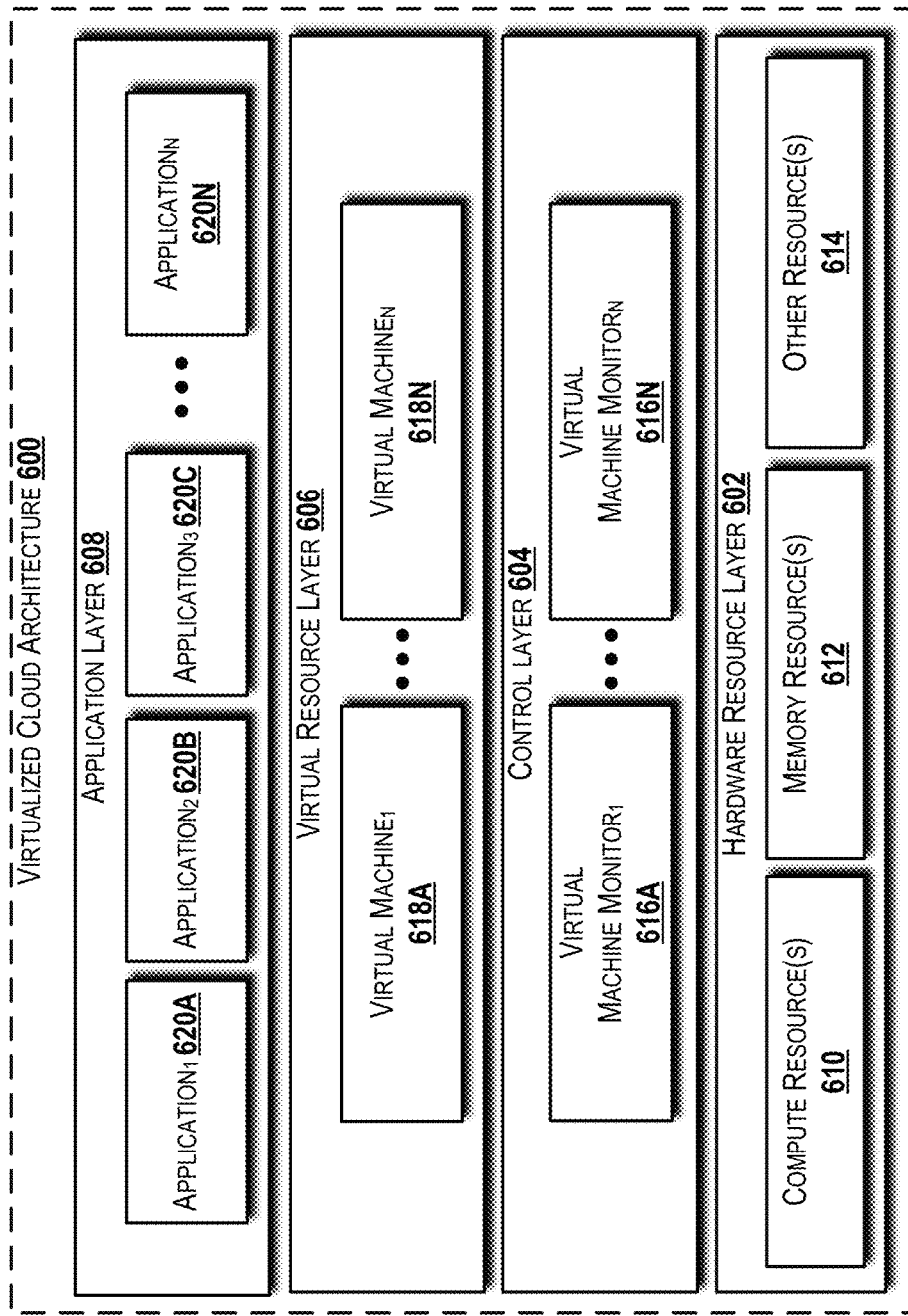
FIG. 6 is a block diagram illustrating an example virtualized cloud architecture and components thereof capable of implementing aspects of the embodiments presented herein.

Turning now to FIG. 6, a block diagram illustrating an example virtualized cloud architecture 600 and components thereof will be described, according to an exemplary embodiment. The virtualized cloud architecture 600 can be utilized to implement various elements disclosed herein. In some embodiments, the mental health user system 106, the healthcare system(s) 128, and/or the friends/family system (s) 140, at least in part, is implemented in the virtualized cloud architecture 600.

The virtualized cloud architecture 600 is a shared infrastructure that can support multiple services and network applications. The illustrated virtualized cloud architecture 600 includes a hardware resource layer 602, a control layer 604, a virtual resource layer 606, and an application layer 608 that work together to perform operations as will be described in detail herein.

The hardware resource layer 602 provides hardware resources, which, in the illustrated embodiment, include one or more compute resources 610, one or more memory resources 612, and one or more other resources 614. The compute resource(s) 610 can include one or more hardware components that perform computations to process data, and/or to execute computer-executable instructions of one or more application programs, operating systems, and/or other software. The compute resources 610 can include one or more central processing units ("CPUs") configured with one or more processing cores. The compute resources 610 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 610 can include one or more discrete GPUs. In some other embodiments, the compute resources 610 can include CPU and GPU components that are configured in accordance with a co-processing CPU/GPU computing model, wherein the sequential part of an application executes on the CPU and the computationally-intensive part is accelerated by the GPU. The compute resources 610 can include one or more system-on-chip ("SoC") components along with one or more other components, including, for example, one or more of the memory resources 612, and/or one or more of the other resources 614. In some embodiments, the compute resources 610 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 610 can be or can include one or more hardware components architected in accordance with an advanced reduced instruction set computing ("RISC") machine ("ARM") architecture, available for license from ARM HOLDINGS. Alternatively, the compute resources 610 can be or can include one or more hardware components architected in accordance with an x86 architecture, such an architecture available from INTEL CORPORATION of Mountain View, California, and others. Those skilled in the art will appreciate the implementation of the compute resources 610 can utilize various computation architectures, and as such, the compute resources 610 should not be construed as being limited to any particular computation architecture or combination of computation architectures, including those explicitly disclosed herein.

The memory resource(s) 612 can include one or more hardware components that perform storage operations, including temporary or permanent storage operations. In some embodiments, the memory resource(s) 612 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 610.

The other resource(s) 614 can include any other hardware resources that can be utilized by the compute resources(s) 610 and/or the memory resource(s) 612 to perform operations described herein. The other resource(s) 614 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more virtual machine monitors ("VMMs") 616A-616N (also known as "hypervisors;" hereinafter "VMMs 616") operating within the control layer 604 to manage one or more virtual resources that reside in the virtual resource layer 606. The VMMs 616 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 610, the memory resources 612, the other resources 614, or any combination thereof. These abstractions are referred to herein as virtual machines ("VMs"). In the illustrated embodiment, the virtual resource layer 606 includes VMs 618A-618N (hereinafter "VMs 618"). Each of the VMs 618 can execute one or more applications 620A-620N in the application layer 608. The applications 620A-620N can include the mental health application 108.

Figure 7:
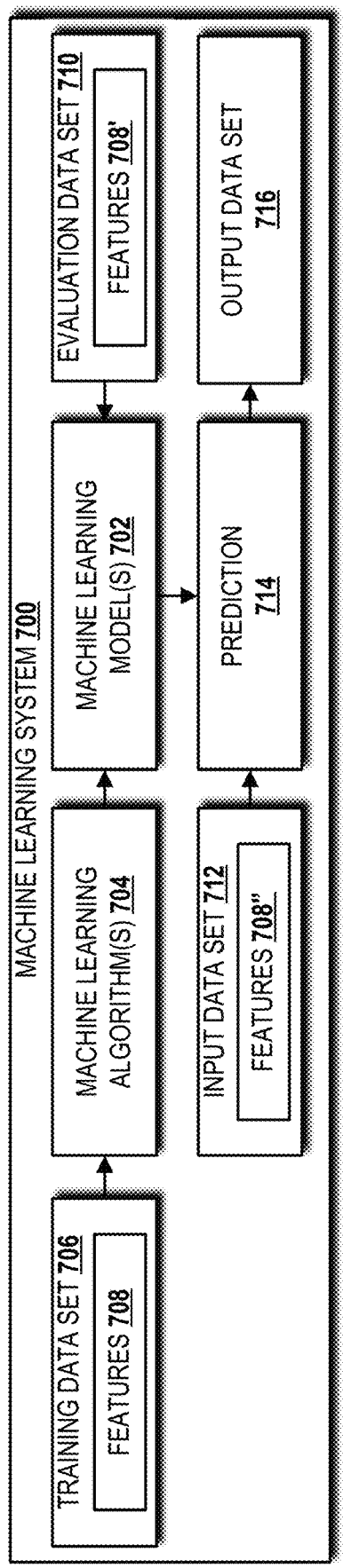
FIG. 7 is a diagram illustrating a machine learning system, according to an illustrative embodiment.

Turning now to FIG. 7, a machine learning system 700 capable of implementing aspects of the embodiments disclosed herein will be described. In some embodiments, aspects of the mental health user system 106 can use machine learning and/or artificial intelligence applications. Accordingly, the mental health user system 106 can include the machine learning system 700 or can be in communication with the machine learning system 700.

The illustrated machine learning system 700 includes one or more machine learning models 702. The machine learning models 702 can include supervised and/or semi-supervised learning models. The machine learning model(s) 702 can be created by the machine learning system 700 based upon one or more machine learning algorithms 704. The machine learning algorithm(s) 704 can be any existing, well-known algorithm, any proprietary algorithms, or any future machine learning algorithm. Some example machine learning algorithms 704 include, but are not limited to, neural networks, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 704 based upon the problem(s) to be solved by machine learning via the machine learning system 700.

The machine learning system 700 can control the creation of the machine learning models 702 via one or more training parameters. In some embodiments, the training parameters are selected modelers at the direction of an enterprise, for example. Alternatively, in some embodiments, the training parameters are automatically selected based upon data provided in one or more training data sets 706. The training parameters can include, for example, a learning rate, a model size, a number of training passes, data shuffling, regularization, and/or other training parameters known to those skilled in the art. The training data in the training data sets 706.

The learning rate is a training parameter defined by a constant value. The learning rate affects the speed at which the machine learning algorithm 704 converges to the optimal weights. The machine learning algorithm 704 can update the weights for every data example included in the training data set 706. The size of an update is controlled by the learning rate. A learning rate that is too high might prevent the machine learning algorithm 704 from converging to the optimal weights. A learning rate that is too low might result in the machine learning algorithm 704 requiring multiple training passes to converge to the optimal weights.

The model size is regulated by the number of input features ("features") 708 in the training data set 706. A greater the number of features 708 yields a greater number of possible patterns that can be determined from the training data set 706. The model size should be selected to balance the resources (e.g., compute, memory, storage, etc.) needed for training and the predictive power of the resultant machine learning model 702.

The number of training passes indicates the number of training passes that the machine learning algorithm 704 makes over the training data set 706 during the training process. The number of training passes can be adjusted based, for example, on the size of the training data set 706, with larger training data sets being exposed to fewer training passes in consideration of time and/or resource utilization. The effectiveness of the resultant machine learning model 702 can be increased by multiple training passes.

Data shuffling is a training parameter designed to prevent the machine learning algorithm 704 from reaching false optimal weights due to the order in which data contained in the training data set 706 is processed. For example, data provided in rows and columns might be analyzed first row, second row, third row, etc., and thus an optimal weight might be obtained well before a full range of data has been considered. By data shuffling, the data contained in the training data set 706 can be analyzed more thoroughly and mitigate bias in the resultant machine learning model 702.

Regularization is a training parameter that helps to prevent the machine learning model 702 from memorizing training data from the training data set 706. In other words, the machine learning model 702 fits the training data set 706, but the predictive performance of the machine learning model 702 is not acceptable. Regularization helps the machine learning system 700 avoid this overfitting/memorization problem by adjusting extreme weight values of the features 708. For example, a feature that has a small weight value relative to the weight values of the other features in the training data set 706 can be adjusted to zero.

The machine learning system 700 can determine model accuracy after training by using one or more evaluation data sets 710 containing the same features 708' as the features 708 in the training data set 706. This also prevents the machine learning model 702 from simply memorizing the data contained in the training data set 706. The number of evaluation passes made by the machine learning system 700 can be regulated by a target model accuracy that, when reached, ends the evaluation process and the machine learning model 702 is considered ready for deployment.

After deployment, the machine learning model 702 can perform a prediction operation ("prediction") 714 with an input data set 712 having the same features 708" as the features 708 in the training data set 706 and the features 708' of the evaluation data set 710. The results of the prediction 714 are included in an output data set 716 consisting of predicted data. The machine learning model 702 can perform other operations, such as regression, classification, and others. As such, the example illustrated in FIG. 7 should not be construed as being limiting in any way.

Turning now to FIG. 8, details of the network 136 are illustrated, according to an illustrative embodiment. The network 136 includes a cellular network 802, a packet data network 804, and a circuit switched network 806. The cellular network 802 can include various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, the mobile device 500, the mental health user system 106, a cellular telephone, a user equipment, a mobile terminal, a PDA, a laptop computer, a handheld computer, and combinations thereof, can be operatively connected to the cellular network 802. The cellular network 802 can be configured as a GSM) network and can provide data communications via GPRS and/or EDGE. Additionally, or alternatively, the cellular network 802 can be configured as a 3G Universal Mobile Telecommunications System ("UMTS") network and can provide data communications via the HSPA protocol family, for example, HSDPA, EUL, and HSPA+. The cellular network 802 also is compatible with 4G mobile communications standards such as LTE, 5G mobile communications standards, or the like, as well as evolved and future mobile standards.

The packet data network 804 includes various systems, devices, servers, computers, databases, and other devices, such as the mental health user system 106, the device(s) 110, the healthcare system(s) 128, and/or the friends/family systems 140, in communication with one another, as is generally known. In some embodiments, the packet data network 804 is or includes one or more WI-FI networks, each of which can include one or more WI-FI access points, routers, switches, and other WI-FI network components. The packet data network 804 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810 such as a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810.

Based on the foregoing, it should be appreciated that concepts and technologies directed to mental health anomaly detection and guidance have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
  collecting, by a mental health user system comprising a processor, from a plurality of sources, data associated with behaviors of a user over a first period of time, wherein the behaviors comprise biometrics associated with the user over the first period of time and at least one of a speed or a frequency of the user interacting with connected devices over the first period of time;
creating, by the mental health user system, a baseline user behavior profile for the user based on the data associated with the behaviors of the user over the first period of time;
monitoring, by the mental health user system, a behavior of the user over a second period of time, wherein the behavior comprises at least one of biometrics associated with the user over the second period of time or at least one of a speed or a frequency of the user interacting with the connected devices over the second period of time;
determining, by the mental health user system, whether the behavior of the user over the second period of time is anomalous in comparison to the baseline user behavior profile created based on the data associated with the behaviors of the user over the first period of time; and
in response to determining that the behavior of the user is anomalous, changing, by the mental health user system, an environment of the user, wherein changing the environment of the user includes remotely starting a vehicle associated with the user.

2. The method of claim 1, wherein the plurality of sources comprises a sensor device operating within the environment.

3. The method of claim 1, wherein monitoring, by the mental health user system, the behavior of the user comprises monitoring, by the mental health user system, the behavior of the user based upon output of data received from an external device.

4. The method of claim 3, wherein the external device comprises a user sensor device, a smart home device, a connected car device, or a user environment device.

5. The method of claim 1, wherein in response to determining that the behavior of the user is anomalous, the method further comprises at least one of:
providing active encouragement to the user;
providing passive encouragement to the user;
escalating to an emergency service;
escalating to a healthcare professional; or
escalating to a friend or family member of the user to encourage social interaction.

6. A mental health user system comprising:
a processor; and
a memory that stores instructions that, when executed by the processor, cause the processor to perform operations comprising
collecting, from a plurality of sources, data associated with behaviors of a user over a first period of time, wherein the behaviors comprise biometrics associated with the user over the first period of time and at least one of a speed or a frequency of the user interacting with connected devices over the first period of time,
creating a baseline user behavior profile for the user based on within the data associated with the behaviors of the user over the first period of time,
monitoring a behavior of the user over a second period of time, wherein the behavior comprises at least one of biometrics associated with the user over the second period of time or at least one of a speed or a frequency of the user interacting with the connected devices over the second period of time,
determining whether the behavior of the user over the second period of time is anomalous in comparison to the baseline user behavior profile created based on the data associated with the behaviors of the user over the first period of time, and
in response to determining that the behavior of the user is anomalous, changing an environment of the user, wherein changing the environment of the user includes remotely starting a vehicle associated with the user.

7. The mental health user system of claim 6, wherein monitoring the behavior of the user comprises monitoring the behavior of the user based upon output of data.

8. The mental health user system of claim 7, further comprising a sensor, wherein the output of the data is received from the sensor.

9. The mental health user system of claim 7, wherein the output of the data is received from an external device comprising a user sensor device, a smart home device, a connected car device, or a user environment device.

10. The mental health user system of claim 6, wherein in response to determining that the behavior of the user is anomalous, the operations further comprise at least one of:
providing active encouragement to the user;
providing passive encouragement to the user;
escalating to an emergency service;
escalating to a healthcare professional; or
escalating to a friend or family member of the user to encourage social interaction.

11. A computer-readable storage medium having instructions stored thereon that, when executed by a processor of a mental health user system, cause the processor to perform operations comprising:
collecting, from a plurality of sources, data associated with behaviors of a user over a first period of time, wherein the behaviors comprise biometrics associated with the user over the first period of time and at least one of a speed or a frequency of the user interacting with connected devices over the first period of time;
creating a baseline user behavior profile for the user based on the data associated with the behaviors of the user over the first period of time;
monitoring a behavior of the user over a second period of time, wherein the behavior comprises at least one of biometrics associated with the user over the second period of time or at least one of a speed or a frequency of the user interacting with the connected devices over the second period of time;
determining whether the behavior of the user over the second period of time is anomalous in comparison to the baseline user behavior profile created based on the data associated with the behaviors of the user over the first period of time; and
in response to determining that the behavior of the user is anomalous, changing, by the mental health user system, an environment of the user, wherein changing the environment of the user includes remotely starting a vehicle associated with the user.

12. The computer-readable storage medium of claim 11, wherein the plurality of sources comprises a sensor device operating within the environment.

13. The computer-readable storage medium of claim 11, wherein monitoring the behavior of the user comprises monitoring the behavior of the user based upon output of data received from an external device.

14. The computer-readable storage medium of claim 13, wherein the external device comprises a user sensor device, a smart home device, a connected car device, or a user environment device.

15. The computer-readable storage medium of claim 11, wherein in response to determining that the behavior of the user is anomalous, the operations further comprise providing active encouragement to the user.

16. The computer-readable storage medium of claim 11, wherein in response to determining that the behavior of the user is anomalous, the operations further comprise providing passive encouragement to the user.

17. The computer-readable storage medium of claim 11, wherein in response to determining that the behavior of the user is anomalous, the operations further comprise escalating to an emergency service, a healthcare professional, or a friend or family member of the user to encourage social interaction.

* * * * *